United States Patent [19]

Ohtsuka

[11] Patent Number: 4,489,952
[45] Date of Patent: Dec. 25, 1984

[54] MECHANICAL SEAL

[75] Inventor: Junji Ohtsuka, Ohsato, Japan

[73] Assignee: Eagle Industry Co., Ltd., Tokyo, Japan

[21] Appl. No.: 235,382

[22] Filed: Feb. 17, 1981

[30] Foreign Application Priority Data

Feb. 29, 1980 [JP] Japan .................. 55-24104

[51] Int. Cl.³ .............................. F16J 15/34
[52] U.S. Cl. .................... 277/96.2; 164/111
[58] Field of Search .......... 164/98, 111; 277/92, 277/96.2

[56] References Cited

U.S. PATENT DOCUMENTS

| | | | |
|---|---|---|---|
| 2,157,453 | 5/1939 | Jaeger | 164/98 |
| 2,425,209 | 8/1947 | Snyder et al. | 277/96.2 |
| 3,050,319 | 8/1962 | Colby | 277/96.2 X |
| 3,086,782 | 4/1963 | Peichii et al. | 277/92 |
| 3,093,383 | 6/1963 | Lew | 277/92 |
| 3,391,942 | 7/1968 | Wilson | 277/96.2 X |
| 4,008,051 | 2/1977 | Caole | 164/98 X |

FOREIGN PATENT DOCUMENTS

| | | | |
|---|---|---|---|
| 108164 | 8/1979 | Japan | 277/96.2 |
| 24738 | 2/1980 | Japan | 164/98 |

Primary Examiner—Nicholas P. Godici
Assistant Examiner—J. Reed Batten, Jr.
Attorney, Agent, or Firm—Jordan and Hamburg

[57] ABSTRACT

A mechanical seal having a floating sheet which comprises an integrally formed slide ring and a retainer, the slide ring, which is provided with a sliding surface, being insert-molded into one end of the retainer at the time of molding of the latter, the sliding ring being difficult to be machined because of its thereto wear- and corrosion-resistance properties, as well as a method of making such floating sheet. The mechanical seal has a highly airtight sliding surface.

6 Claims, 6 Drawing Figures

MECHANICAL SEAL

BACKGROUND OF INVENTION

This invention is concerned with a shaft sealing technique for a mechanical seal.

Heretofore, a mechanical seal used in a shaft sealing device frequently used a floating sheet of the type in which the floating sheet is moved uniaxially by the elastic repulsive force of an O-ring fitted over the floating sheet to bring its sliding surface into abutment. As shown in FIG. 1, this floating sheet (10) is such that a sliding surface (12) is integrally molded at one end of an annular base portion (14), and an O-ring is fitted over a tapered peripheral groove (16) formed on the outer periphery of the annular base portion (14). However, the above floating sheet (10) is formed by casting and, in order to improve the wear resistance of the sliding surface, it usually is subjected to heat treatment such as hardening. Therefore, the dimensional accuracy is difficult to attain and the after treatment is not easy, for which reason its manufacture is extremely difficult. As a result there have been variations in the quality of the resulting product. Further, due to deformation or dimensional error of the floating sheet (10), particularly the tapered peripheral groove (16) which serves as an allowance for compression of an O-ring becomes non-uniform, resulting in the sealing performance being deteriorated. In view of and in an effort to remedy such drawbacks there have been proposed such constructions as illustrated in FIGS. 2 and 3 in which retainer (18) and slide ring (20) are separately formed and, after machining the slide ring (20) by means of a lathe or the like, both are combined together integrally. In the case of a floating sheet (22) shown in FIG. 2, the slide ring (20) and the retainer (18) are integrated together by the so-called "caulking method," that is, the slide ring (20) is fitted into one end of the retainer (18) and then an outer periphery (24) of the retainer (18) is bent into pressure contact with an outer periphery (26) of the slide ring (20) airtightly throughout the circumference. And in the case of the floating sheet (28) illustrated in FIG. 3, the slide ring (20) and the retainer (18) are integrated together by the so-called "shrinkage fit method" wherein a fitting stepped portion (30) formed at one end of the retainer (18) is subjected to thermal expansion by heating, and the slide ring (20) is fitted to the so-expanded fitting stepped portion (30) and both are integrated together airtightly at normal temperature. In both cases of the floating sheets (22) and (28), however, since the slide ring (20) and the retainer (18) are each manufactured individually and then brought into integration, the magnitude of respective dimensional errors in machining is likely to affect directly the stress on the slide ring (20), resulting in that a plane strain is produced on the sliding surface (12) of the slide ring (20) so that good airtightness is not attained. The floating sheets (22) and (28) involve such a problem. In the former floating sheet (22), the magnitude of caulking force applied throughout the circumference of the outer periphery (24) of the retainer (18) has influence upon the magnitude of the pressure-bonding force, and the difference in distribution of such pressure-bonding force causes a strain in the slide ring (20). The latter floating sheet (28), shown in FIG. 3, is also disadvantageous in that the machining error between the outer periphery of the slide ring (20) and the fitting stepped portion (30) of the retainer (18) produces a difference in the pressure-bonding force at the time of shrinkage fit, resulting in the slide ring (20) being deformed or broken. Such being the case, there has been a demand for a mechanical seal provided with a floating sheet having a high sealing characteristic free from plain strain of the sliding surface (12), and for a method of making such a floating sheet.

BRIEF SUMMARY OF INVENTION

In view of the foregoing drawbacks, it is an object of this invention to provide, in a mechanical seal provided with a floating sheet comprising an integrally formed slide ring and retainer, a floating sheet free from plane strain on the sliding surface of the slide ring, and to thereby construct a mechanical seal superior in shaft sealing effect.

It is another object of this invention to provide a method of making a floating sheet free from plane strain on the sliding surface.

In this invention, in order to achieve the abovementioned objects, a slide ring having wear- and corrosion-resistance properties and being provided with a sliding surface which is heat-treated if required is integrated with a retainer by being insert-molded into one end of the retainer at the time of molding of the latter to form a floating sheet, and the so-formed floating sheet is used in a mechanical seal.

This invention is as briefly summarized above, but the foregoing and further objects and novel features of the invention will more fully appear from the following detailed description when the same is read in connection with the embodiment illustrated in the accompanying drawings. It is to be understood, however, that the drawings merely show an embodiment for illustration of the invention and is not intended to limit the scope of the invention.

DESCRIPTION OF PREFERRED EMBODIMENT

Figure 1:
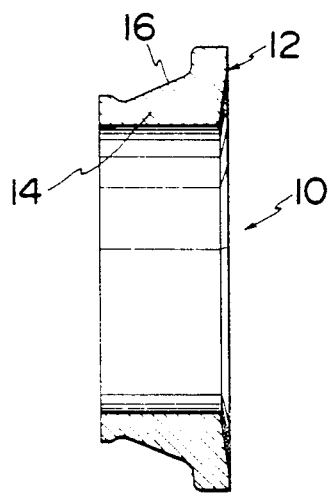
FIGS. 1, 2 and 3 are sectional views of conventional floating sheets.
Figure 2:
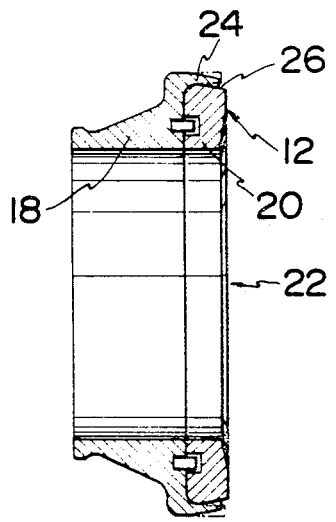
Figure 3:
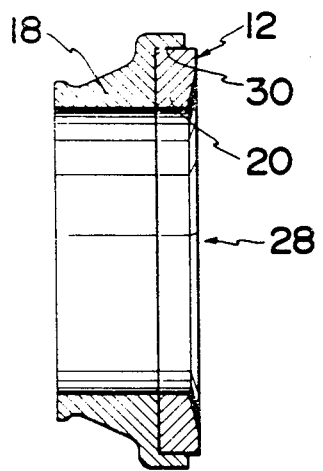
Figure 4:
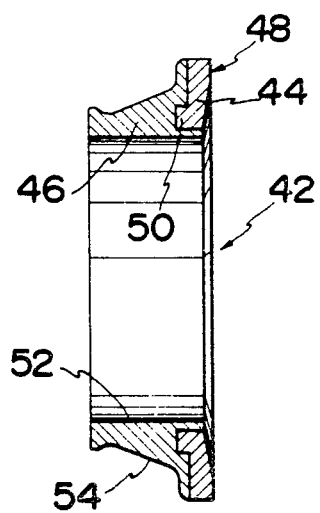
FIG. 4 is a sectional view of a floating sheet embodying the invention.
Figure 5:
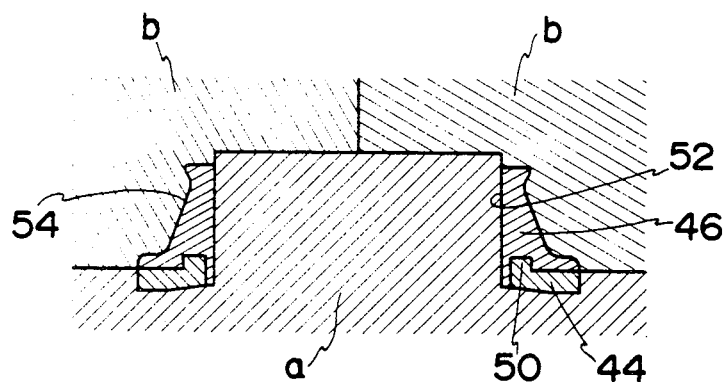
FIG. 5 is a sectional view showing the condition at the time of manufacture of the floating sheet of the invention.

As illustrated in FIG. 4, a floating sheet (42) of this invention comprises integrally formed slide ring (44) and retainer (46). The slide ring (44) is an annular body including a sliding surface (48) at one end thereof in the axial direction for which reason it is made from a material having wear- and corrosion-resistance properties according to the use and conditions, and further including on the surface opposite to the sliding surface (48) an annular edge portion (50) having a dovetail section. The retainer (46) is formed from a moldable material such as a material capable of being cast or die cast. In the molding operation for the retainer (46), for example as shown in FIG. 5, there is provided a flask consisting of a bottom part (a) and side parts (b) and the slide ring (44) is held in a predetermined position in the flask, under which condition a melt of the retainer (46) is poured into the flask consisting of the parts (a) and (b). The melt thus poured enters the annular edge portion (50) and one side of the slide ring (44) and then solidifies to become integral with the slide ring (44) and at the same time form an axial bore (52) and a tapered peripheral groove (54) on the outer periphery.

By the aforesaid manufacturing method there can be formed the floating sheet (42) free from plane strain on the sliding surface (48) since the stress on the slide ring (44) is made uniform and stable. Further, since the slide ring (44) is formed of a separate material from that of the retainer (46), such material can be selected optionally according to design conditions such as wear- and corrosion-resistance. If required, before integration with the retainer, the slide ring (44) may be subjected to heat treatment such as hardening, and in this case even if the slide ring (44) is deformed, such deformation has no influence upon the retainer (46), that is, the retainer (46) can maintain its own accuracy.

Figure 6:
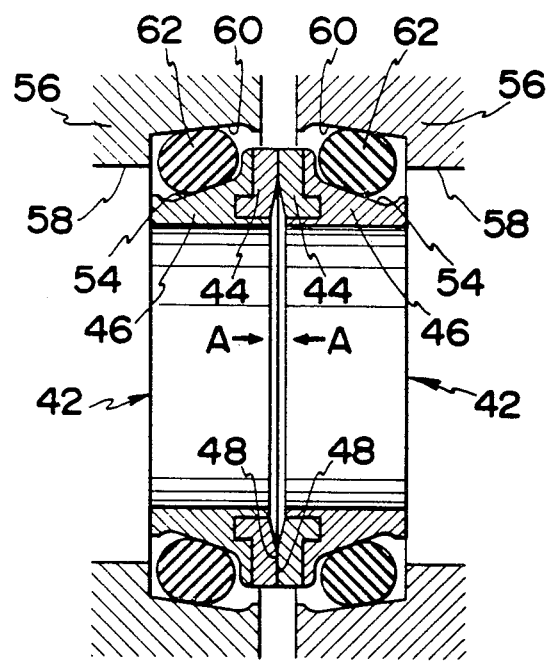
FIG. 6 is a sectional view of the principal parts of a mechanical seal assembly.

FIG. 6 shows an example of assembly of a mechanical seal having the floating sheet (42) of this invention, wherein at the ends of axial bores (58)(58) of opposed housings (56)(56) are formed tapered annular step portions (60)(60), and in the stepped portions (60)(60) are positioned in opposed manner a pair of floating sheets (42)(42) with the sliding surfaces (48)(48) in abutment with each other. Between the tapered annular step portions (60)(60) and the tapered peripheral grooves (54)(54) of the retainer (46)(46) are interposed O-rings (62)(62), and by the action of the tapered surfaces the floating sheets (42) (42) are resiliently biased in the abutting direction (in the direction of the arrow marked A) of the sliding surfaces (48)(48), and thus there is constructed a shaft sealing mechanism which is rendered rotatable by means of both sliding surfaces (48)(48).

In the mechanical seal of this invention, as set forth hereinbefore, the slide ring is insert-molded into the retainer at the time of molding of the latter to form an integrally constructed floating sheet, whereby the accuracy of the sliding surface of the slide ring is maintained to provide high air-tightness and a mechanical seal superior in shaft sealing effect.

Although the invention has been described in its preferred form, it is apparent that various modifications and variations may be made without departing from the principle of the invention, and therefore it is intended to cover in the appended claims all of such modifications and variations as substantially attain the effect of the invention through the use of its construction which is substantially the same as or corresponds to the scope of the invention.

What is claimed is:

1. A mechanical seal comprising a retainer ring having an inner cylindrical surface and an outer conical surface, said retainer ring having a longitudinal end defined by a planar surface disposed perpendicular to the axis of said cylindrical surface, said planar surface extending to the outer periphery of said retainer ring, an annular groove in said planar surface having a pair of side walls and a bottom wall, one of said pair of side walls being longer than the other of said pair of side walls, a slide member having an annular ring portion disposed in and mating with said groove, said annular ring portion and said groove having a dovetail configuration, said slide member having a planar portion disposed against and mating with said planar surface of said retainer ring, said slide member being made of a wear-resistant material, said retainer ring being made of a different material, said mating of said ring portion with said groove and said mating of said planar portion with said planar surface being an integral construction providing an integral juncture, said integral construction being formed by pouring the melted material which is to form said retainer ring around said annular ring portion and against said planar portion such that upon solidification thereof, said integral juncture is obtained, said slide member having a sliding surface disposed perpendicular to the longitudinal axis of said cylindrical surface, a second retainer ring and a second slide member of the same construction as the first said retainer ring and the first said slide member respectively, resilient sealing rings disposed on said conical surfaces of the first said retainer ring and said second retainer ring, the first said retainer ring and said second retainer ring being coaxially disposed such that said sliding surface of the first said sliding member slidingly abuts the sliding surface of said second sliding member along a sliding plane of contact disposed perpendicular to the axis of said cylindrical surface.

2. A mechanical seal according to claim 1 wherein said slide member has a generally L-shaped cross-sectional configuration with two leg portions with one leg portion forming said annular ring portion.

3. A mechanical seal according to claim 2, wherein said two leg portions are perpendicular to one another.

4. A mechanical seal according to claim 1, wherein said one side wall is disposed radially inwardly of said other side wall.

5. A mechanical seal according to claim 4, wherein said other side wall terminates at said planar surface of said retainer ring.

6. In a mechanical seal, the combination comprising a retainer ring having an inner cylindrical surface and an outer conical surface, said retainer ring having a longitudinal end defined by a planar surface disposed perpendicular to the axis of said cylindrical surface, said planar surface extending to the outer periphery of said retainer ring, an annular groove in said planar surface having a pair of side walls and a bottom wall, one of said pair of side walls being longer than the other of said pair of side walls, a slide member having an annular ring portion disposed in and mating with said groove, said annular ring portion and said groove having a dovetail configuration, said slide member having a planar portion disposed against and mating with said planar surface of said retainer ring, said slide member being made of a wear-resistant material, said retainer ring being made of different material, said mating of said ring portion with said groove and said mating of said planar portion with said planar surface being an integral contruction providing an integral juncture, said integral construction being formed by pouring the melted material which is to form said retainer ring around said annular ring portion and against said planar portion such that upon solidification thereof, said integral juncture is obtained, said slide member having a sliding surface disposed perpendicular to the longitudinal axis of said cylindrical surface.

* * * * *